(12) United States Patent
Thorpe

(10) Patent No.: US 6,286,790 B1
(45) Date of Patent: Sep. 11, 2001

(54) AEROFOIL HAVING A SLAT WITH FLEXIBLE DATA LINK

(75) Inventor: Michael Thorpe, Bristol (GB)

(73) Assignee: Bae Systems plc, Farnborough (GB)

( * ) Notice: Subject to any disclaimer, the term of this patent is extended or adjusted under 35 U.S.C. 154(b) by 0 days.

(21) Appl. No.: 09/428,533

(22) Filed: Oct. 28, 1999

(30) Foreign Application Priority Data

Aug. 5, 1998 (GB) .................................................... 9816936

(51) Int. Cl.[7] ........................................................ B64C 3/50
(52) U.S. Cl. ............................................................. 244/214
(58) Field of Search .................................. 244/214, 213, 244/215, 211, 212, 134 D

(56) References Cited

U.S. PATENT DOCUMENTS

| | | | |
|---|---|---|---|
| 1,732,873 | * | 10/1929 | Yock . |
| 2,763,446 | * | 9/1956 | Davie . |
| 3,792,189 | | 2/1974 | Grassl . |
| 4,008,368 | * | 2/1977 | Leuchs . |
| 4,469,297 | | 9/1984 | Cole . |
| 4,615,499 | | 10/1986 | Knowler . |
| 4,725,825 | * | 2/1988 | McKean . |
| 5,680,124 | * | 10/1997 | Bedell et al. . |
| 5,839,698 | * | 11/1998 | Moppert . |
| 6,143,987 | * | 11/2000 | Makita . |

FOREIGN PATENT DOCUMENTS

| | | |
|---|---|---|
| 0 397 438 | 11/1990 | (EP) . |
| 0 680 878 | 11/1995 | (EP) . |

\* cited by examiner

Primary Examiner—Charles T. Jordan
Assistant Examiner—Tien Dinh
(74) Attorney, Agent, or Firm—Nixon & Vanderhye P.C.

(57) ABSTRACT

The slat 16 is mounted to extend and retract relative to the aerofoil 10 and a data line 28 supported on a mounting cable 20 extends between the slat 16 and the aerofoil 10. The data line 28 is arranged to wrap around the leading edge 12 of the aerofoil 10 in the fully retracted position of the slat 16 and to extend substantially along a straight line between the aerofoil 10 and the slat 16 when the slat is in its fully extended position.

14 Claims, 3 Drawing Sheets

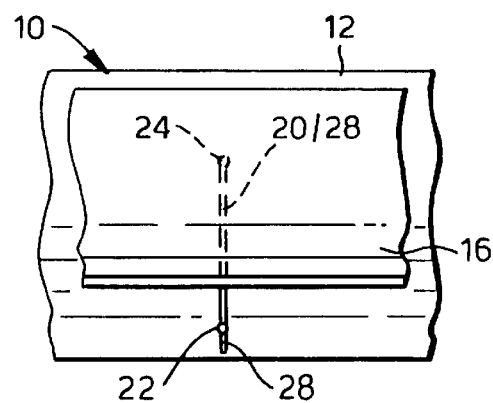
Fig.4A.
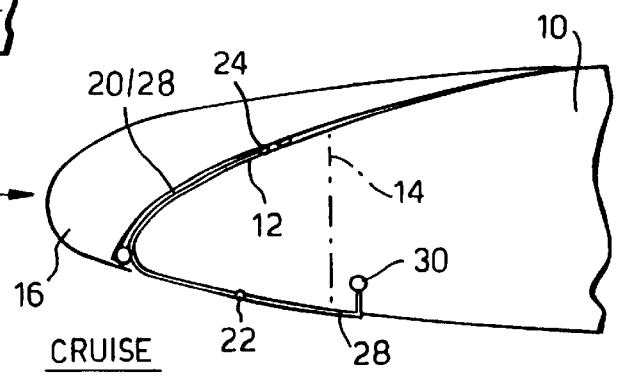
Fig.4. CRUISE
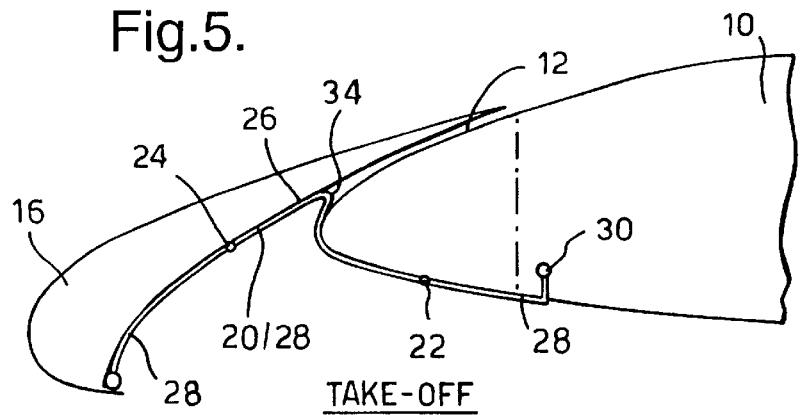
Fig.5. TAKE-OFF
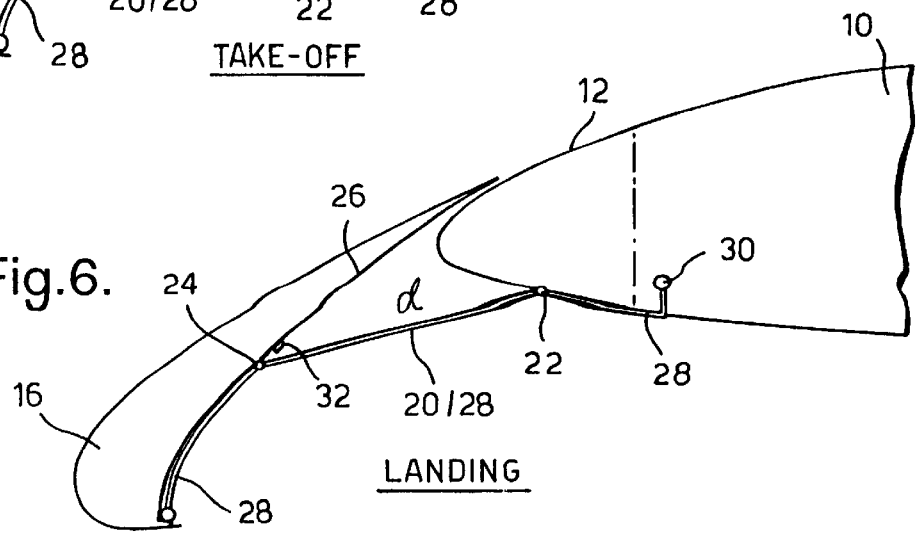
Fig.6. LANDING

AEROFOIL HAVING A SLAT WITH FLEXIBLE DATA LINK

BACKGROUND OF THE INVENTION

1. Field of the Invention

The invention relates to an aerofoil having a slat mounted to extend and retract relative to the aerofoil to increase lift especially during landing and take off of an aircraft.

2. Discussion of Prior Art

In certain aircraft, it is usual to provide a data link between the slat and the aerofoil to enable data such as pressure and temperature to be monitored. Known data links necessitate use of the usual slat mounting track to form a component of the data link. That involves complexity and considerable expense and an object of the present invention is to provide an aerofoil having a slat with an improved data link arrangement.

SUMMARY OF THE INVENTION

According to the invention there is provided an aerofoil having a slat mounted to extend and retract relative to the aerofoil and a data link extending between the slat and the aerofoil, the data link comprising a line arranged to lie against the aerofoil in the fully retracted position of slat and to extend across a gap between the aerofoil and the slat when the slat is in its fully extended position.

By using a simple line as set out above, the cost of providing the data link is reduced significantly and the data link is far less complex.

Preferably, the line is arranged to wrap around the leading edge of the aerofoil when the aerofoil is in its fully retracted position.

In the preferred embodiment, the line extends substantially along a straight line across the gap when the slat is in its fully extended position.

By causing the line to wrap around the leading edge of the aerofoil as set out above, the risk of fretting against the leading edge is minimised. Also, with the line extending substantially along a straight line between the aerofoil and the slat, the risk of vibration and significant flapping due to air flow is also substantially minimised.

In use, fluid flow between the aerofoil and the slat preferably causes the line to lie partially against the rear of the slat and to wrap partially around the leading edge of the aerofoil where the slat lies between the fully retracted and fully extended positions.

Preferably, the slat moves along a track on the aerofoil and, in such a case, the line is preferably positioned to one side of the track. In such a case, and where the aerofoil extends outwardly from a mounting such as an aircraft fuselage, the line is preferably arranged outboard of the track.

In the preferred embodiment, the line is carried by a support such as a cable anchored at one end to the aerofoil and at the other end to the slat. Tension in the support is preferably sufficient to maintain the support line substantially straight but insufficient to lead to vibration thereof resulting from air flow over the support and the line thereon when the slat is in its fully extended position. The positioning of anchor points on the aerofoil and slat for the support is preferably selected such that the shortest distance around the leading edge of the aerofoil between the two anchor points in the fully retracted position of the slat is substantially the same as the distance in a straight line between the two anchor points in the fully extended position of the slat.

BRIEF DESCRIPTION OF THE DRAWINGS

The aerofoil is preferably a wing of an aircraft.

An aerofoil having a slat in accordance with the invention will now be described by way of example with reference to the accompanying drawings in which:

FIG. 1A is a view of part of the leading edge shown in FIG. 1 looking in the direction of arrow A in FIG. 1;

FIG. 4 is a diagrammatic view showing the position of the data line with the slat in its fully retracted position;

FIG. 4A is a view on arrow B in FIG. 4;

FIG. 5 is a view similar to FIG. 4 but showing the configuration of the data line with the slat between its fully retracted and fully extended positions; and FIG. 6 shows the position of the data line where the slat is fully extended.

DETAILED DISCUSSION OF PREFERRED EMBODIMENTS

Figure 1:
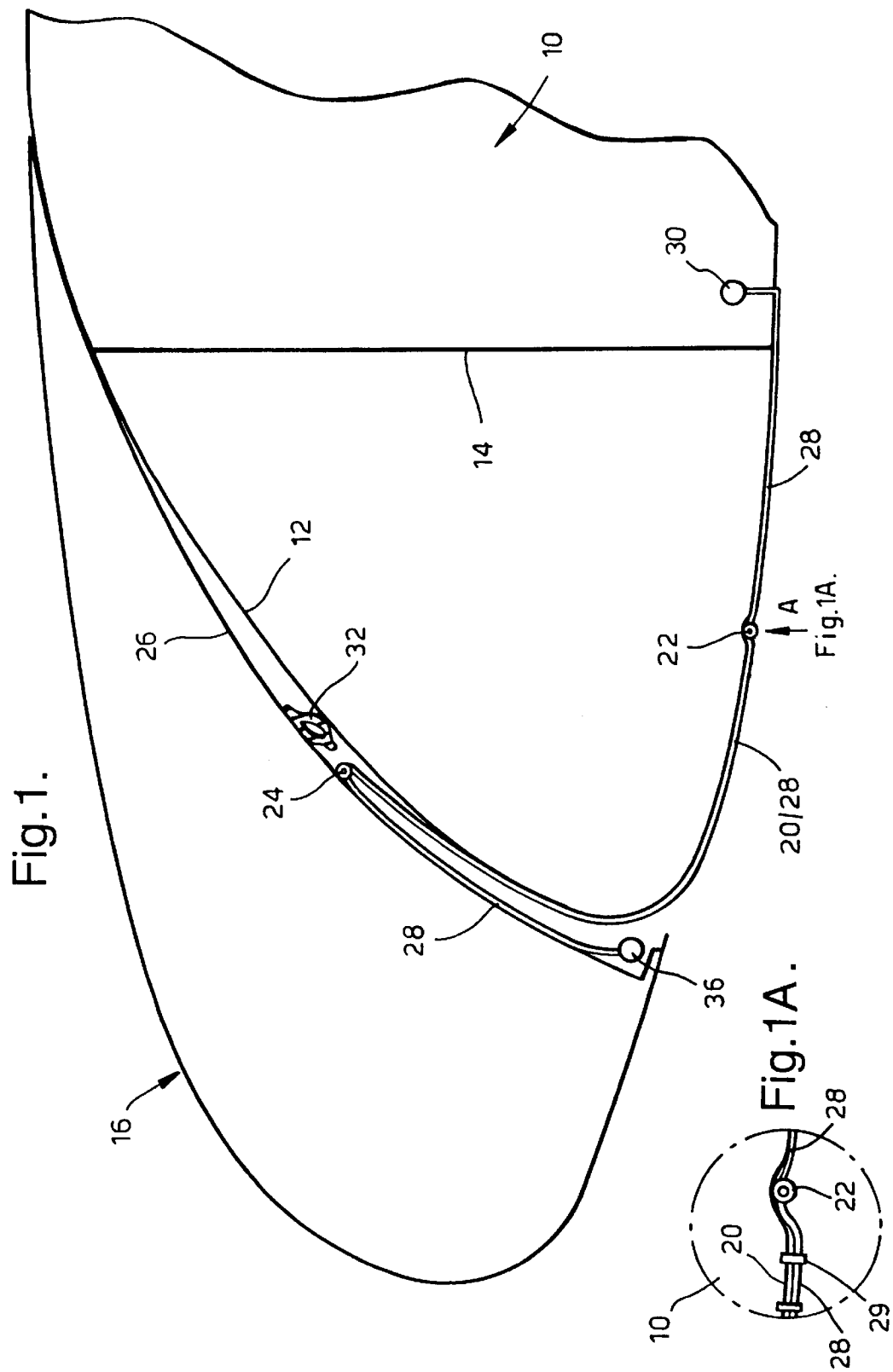
FIG. 1 is a diagrammatic cross section through part of a leading edge of an aircraft wing showing the slat in a retracted position.

Looking at FIG. 1, a wing 10 has a leading edge 12 ahead of a wing sub-spar 14. A slat 16 is mounted for movement forwardly and downwardly relative to the wing 10 in known manner, the slat being mounted for movement on tracks indicated generally at 18 in FIG. 3.

A support cable 20 is anchored at 22 to the wing 10 and the opposite end of the support cable is anchored at 24 to a rear face 26 of the slat 16. The anchors 22, 24 may be in the form of panel fixing screws.

Figure 2:
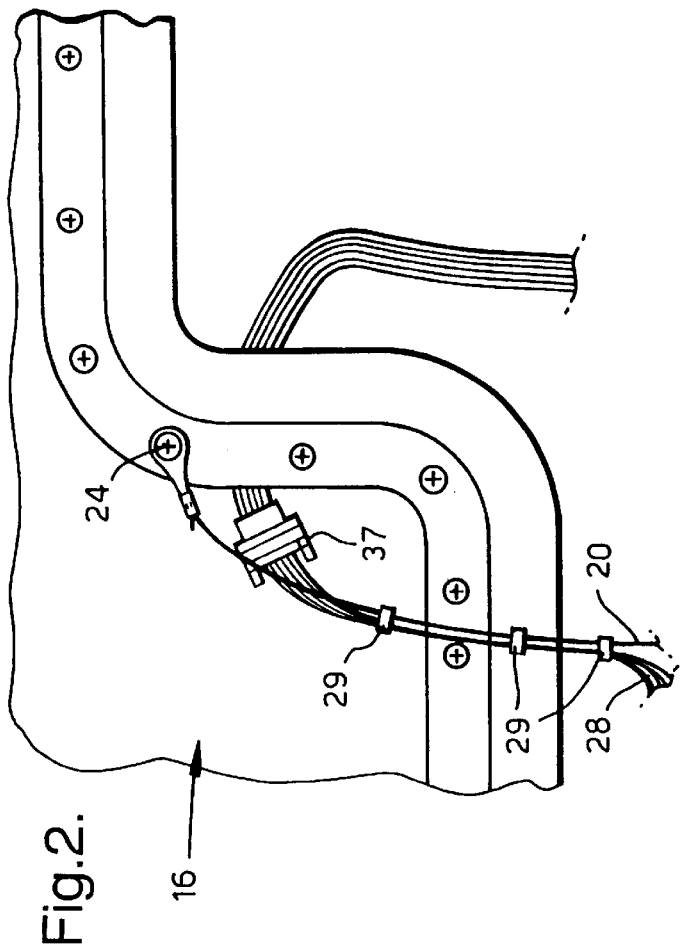
FIG. 2 is an underside view of part of the slat shown in FIG. 1 illustrating a line for carrying data and a support cable.

A line 28 for carrying data, for example a tri-axial cable or a number of multi-core cables or one or more tubes, is secured by suitable attachments 29 to the support cable 20 (see FIGS. 1A and 3) to carry signals from sensors (not shown) on the slat 16 to a point 30 on the wing 10. The point 30 is connected to a further line (not shown) which carries the signals to a suitable processing point on the aircraft. As can be seen from FIG. 1, the data line 28 leaves the support cable 20 adjacent the anchor 24 and extends downwardly along the rear face 26 of the spar 16 terminating at a connector 36 supported by a bracket (not shown) mounted on the slat 16. Conveniently, that section of the data line 28 which lies against the rear face 26 of the slat 16 can be taped against the rear face for security. Alternatively, and as shown in FIG. 2, the data line 28 leaves the support cable 20 adjacent the anchor 24 and terminates at an adjacent connector 37.

The operation of the slat 16 will now be described with reference to FIGS. 4 to 6.

With the aircraft cruising, the slat 16 is arranged as shown in FIGS. 4 and 4A which corresponds to the position shown in FIG. 1. In that condition, the data line 28 and the support cable 20 wrap around the leading edge 12 with sufficient firmness so as to be resistant to movement resulting from flow of air. In the FIG. 4 position, a seal 32 on the slat sealingly contacts the leading edge 12 to prevent air from flowing between the leading edge 12 and the rear face 26 of the slat 16.

In FIG. 5, the slat 16 is shown extended for take off. In that position, the seal 32 has moved out of contact with the leading edge 12 and air is able to flow between the leading edge 12 and the rear face 26 of the slat 16. Air flow causes part of the support cable 20 and data line 28 thereon to wrap around the leading edge 12 and a further part thereof to lie against the rear face 26 of the slat 16, an intermediate section 34 thereof being forced by the air stream upwardly into the space between the leading edge 12 and the slat 16. It will be appreciated that the support cable 20 and data line 28 are held firmly in position by the air flow virtually eliminating vibration or other unwanted movement and, therefore minimising fretting of the leading edge 12.

FIG. 6 shows the fully extended position of the slat 16 where the aircraft is landing. In that position the slat 16 has positioned the anchor 24 relative to the anchor 22 so that the support cable 20 extends substantially in a straight line between them. Tension in the support cable 20 is that which results from the weight of the support cable 20 and the data line 28 thereon and movement of the slat 16 to the FIG. 6 position is not intended to pull the support cable 20 tight.

Although the support cable 20 and data line 28 thereon may move slightly as a result of air flow, the absence of any significant tension effectively prevents the support cable and data line vibrating. The distance d between the anchors 22, 24 for the support cable 20 as shown in FIG. 6, corresponds substantially to the shortest distance around the leading edge 12 between the anchors 22, 24 when in the FIG. 1 position.

Figure 3:
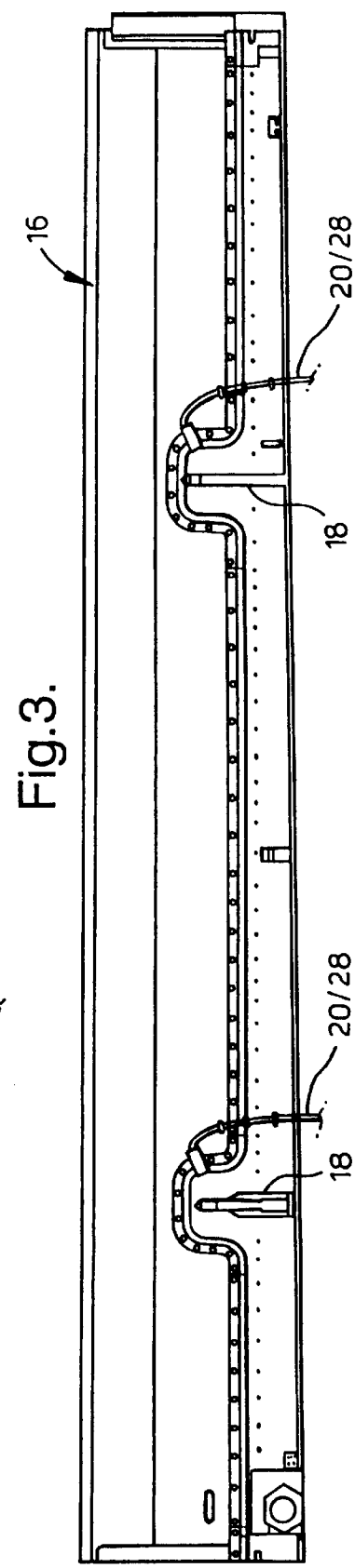
FIG. 3 is an underplan view of a complete slat for an opposite wing to that shown in FIG. 2.

As shown in FIG. 3, the mounting cable 20 and data line 28 thereon are positioned outboard of the respective tracks 18. In that way, the data line 28 is positioned well clear of the normal slat track cover (not shown).

Typically, the data line 28 will be used to transmit information from sensors an/or transducers on the slat 16 for sensing static/dynamic pressures, loading applied to the track, internal or external temperatures etc. Also, the support cable 20 can support a cable to carry power to the sensors/transducers.

What is claimed is:

1. An aerofoil having a slat mounted to extend and retract relative to the aerofoil and a data link extending between the slat and the aerofoil, the data link comprising a line arranged to lie against the aerofoil in the fully retracted position of the slat and to extend across a gap between the aerofoil and the slat when the slat is in its fully extended position said line having one end anchored to said slat at an anchor point and another end anchored to said aerofoil at an anchor point, said line unsupported between said anchored ends.

2. An aerofoil according to claim 1 in which the line extends substantially on a straight line across the gap when the slat is in its fully extended position.

3. An aerofoil according to claim 1 in which the line is arranged to wrap around at least part of the leading edge of the aerofoil when the slat is in its filly retracted position.

4. An aerofoil according to claim 3 in which, in use, fluid flow causes the line to wrap around at least part of the leading edge of the aerofoil where the slat lies between the fully retracted and fully extended positions.

5. An aerofoil according to claim 1, in which the line, in use, lies partially against the underside of the slat where the slat lies between the fully retracted and fully extended positions.

6. An aerofoil according to claim 5, in which, in use, fluid flow causes the line to lie partially against the underside of the slat where the slat lies between the fully retracted and fully extended positions.

7. An aerofoil according to claim 1 in which the slat moves along a tract on the aerofoil and the line is positioned to one side of the track.

8. An aerofoil according to claim 7 in which the aerofoil extends outwardly from a mounting such as an aircraft fuselage and the line is arranged outboard of the track.

9. An aerofoil according to claim 1 in which the line includes a support cable anchored at one end to the aerofoil and at the other end to the slat.

10. An aerofoil according to claim 9 in which the positioning of the anchor points on the aerofoil and slat for the support cable is selected such that the shortest distance around the leading edge of the aerofoil between the two anchor points in the fully retracted position of the slat is substantially the same as the distance in a straight line between the two anchor points in the fully extended position of the slat.

11. An aerofoil according to claim 1 in the form of an aircraft wing.

12. An aircraft having an aerofoil according to claim 1.

13. An aerofoil having a slat mounted to extend and retract relative to the aerofoil and a data link extending between the slat and the aerofoil, the data link comprising a line arranged to lie against the aerofoil in the fully retracted position of the slat and to extend across a gap between the aerofoil and the slat when the slat is in its fully extended position wherein the line extends substantially on a straight line across the gap when the slat is in its fully extended position.

14. An aerofoil having a slat mounted to extend and retract relative to the aerofoil and a data link extending between the slat and the aerofoil, the data link comprising a line arranged to lie against the aerofoil in the fully retracted position of the slat and to extend across a gap between the aerofoil and the slat when the slat is in its fully extended position wherein the line is arranged to wrap around at least part of the leading edge of the aerofoil when the slat is in its filly retracted position, wherein, in use, fluid flow causes the line to wrap around at least part of the leading edge of the aerofoil where the slat lies between the fully retracted and fully extended positions.

* * * * *